United States Patent [19]

Graham et al.

[11] Patent Number: 4,811,230

[45] Date of Patent: Mar. 7, 1989

[54] INTERVENTION FLIGHT MANAGEMENT SYSTEM

[75] Inventors: Donald A. Graham, Redmond; Thomas E. Edmonds, Bellevue, both of Wash.

[73] Assignee: Boeing Company, Seattle, Wash.

[21] Appl. No.: 897,141

[22] Filed: Aug. 15, 1986

[51] Int. Cl.⁴ .............................................. G06F 15/50
[52] U.S. Cl. .................................... 364/428; 364/427; 364/433
[58] Field of Search .............. 364/424, 427, 428, 436, 364/430, 439, 433, 442, 443; 73/178 T

[56] References Cited

U.S. PATENT DOCUMENTS

| | | | |
|---|---|---|---|
| 2,992,558 | 7/1961 | Newell et al. | 73/178 |
| 3,612,837 | 10/1971 | Brandon | 364/424 |
| 3,662,976 | 5/1972 | Gesler | 340/963 X |
| 3,668,622 | 6/1972 | Gannett et al. | 340/27 R |
| 3,701,945 | 10/1972 | Gallant et al. | 364/424 X |
| 3,786,505 | 1/1974 | Rennie | 343/7 ED |
| 3,868,497 | 2/1975 | Vietor | 364/430 |
| 3,936,797 | 2/1976 | Andresen, Jr. | 340/977 |
| 4,019,702 | 4/1977 | Annin | 73/178 T |
| 4,163,387 | 8/1979 | Schroeder | 73/178 R |
| 4,212,064 | 7/1980 | Forsythe et al. | 364/424 |
| 4,283,705 | 8/1981 | James et al. | 340/973 |
| 4,312,041 | 1/1982 | DeJonge | 364/442 |
| 4,325,123 | 4/1982 | Graham et al. | 364/442 |
| 4,538,229 | 8/1985 | Baltzer et al. | 364/428 |
| 4,642,775 | 2/1987 | Cline et al. | 364/443 |

Primary Examiner—Parshotam S. Lall
Assistant Examiner—Thomas G. Black
Attorney, Agent, or Firm—Christenson, O'Connor, Johnson & Kindness

[57] ABSTRACT

An Intervention Flight Management System (IFMS) that allows a pilot to intervene in the operation of a preprogrammed flight management computer and change the speed and/or flight path of an airplane in response to air traffic control (ATC) instructions is disclosed. The IFMS includes an IFMS control panel via which the pilot interfaces with an IFMS program. The IFMS program includes intervention subroutines that override the preprogrammed instructions that control the flight management computer. The intervention subroutines include a lateral (direction) control subroutine and several vertical subroutines. The vertical subroutines include altitude, speed and vertical path subroutines. The intervention subroutines can be engaged independently of one another. Control axes unrelated to an engaged intervention subroutine remain under the control of the preprogrammed flight management computer instructions.

22 Claims, 11 Drawing Sheets

INTERVENTION FLIGHT MANAGEMENT SYSTEM

TECHNICAL AREA

This invention relates to airplance control systems and, more particularly, airplane flight management systems that control the flight path of an airplane.

BACKGROUND OF THE INVENTION

Modern jet transports are equipped with a cockpit panel that interfaces with a flight management system to control the selection and engagement of automatic flight control modes of operation. The panel is usually mounted on the glare shield within easy reach of both pilots and is given various names such as "mode control panel," "mode select panel," "flight control unit," etc. The panel provides an interface between the pilot and the flight management system, which controls the autopilot/authothrottle systems of the airplane. The panel is used by the pilots to select the vertical and lateral flight control modes desired, which selection supercedes pre-existing and/or default modes. The vertical mode is used to control the airplane's speed (by controlling enginer thrust and airplane attitude) and altitude between takeoff and landing. Typically, a pilot selects the thrust rating of the engines and a desired vertical speed for the initial climb after takeoff. Next, the pilot typically sets thrust at the rating level of the engines and speed at a desired climb speed for the enroute climb to cruise altitude. When cruise altitude is reached, speed is set based on some established criteria (most economical, shortest elapsed time, etc.) consistent with maintaining the cruise altitude. During descent, typically, the pilot sets the engines to their idle thrust rating and selects a descent speed designed to achieve the desired descent profile. The lateral mode is used by the pilot to select any one of various options. It may be used to select a particular heading, which would result in the airplane's flight path changing to a selected heading. Alternatively, the present heading may be maintained by a heading hold selection. Or, automatic navigation, which tracks a preprogrammed route using steering signals from an inertial or area navigation system, may be selected.

More recent flight management systems have been enhanced by the addition of more sophisticated automatic flight control modes of operation. These include flight level change (FLCH), vertical navigation (VNAV) and lateral navigation (LNAV) flight control modes of operation. The FLCH mode automatically manages thrust and speed to climb or descend from one altitude to another. The VNAV mode provides automatic optimized profile control from initial climb through final approach, including adherence to terminal area procedure speed and altitude constraints. The LNAV mode provides automatic steering to a preprogrammed route including selected terminal automatic flight control araea procedures.

Regardless of the sophistication of the modes of operation, in all flight management systems, the pilot chooses the available modes that will best accomplish the desired vertical flight profile and lateral routeing. In most instances, the pilot plans the flight in advance, both laterally and vertically, and preprograms the LNAV and VNAV modes so that the desired flight path will be followed. While preprogrammed flights are advantageous because they reduce the pilot's burden, particularly during takeoff and landing, in practice, rarely can flights be flown as preplanned. Usually, rerouting an reclearances instructions are received from air traffic control (ATC) during the flight. These instructions force the pilot to depart from the vertical flight profile and/or the lateral route that was originally planned. In some instances, rerouting and reclearance come far enough in advance to allow the pilot to reprogram the route or profile instructions stored in the memory of a flight management computer so that the flight management system can remain in the LNAV and VNAV flight control modes. On other occasions, pilots are forced to depart from LNAV and VNAV modes in order to comply with ATC instructions in a timely manner. Unfortunately, this often occurs when the ATC instructions cannot be conveniently accommodated either due to crew workload or system capability.

When a pilot is required to depart from LNAV or VNAV modes of operation in order to comply with ATC rerouting or reclearance instructions, the pilot must determine and select the alternate modes of operation which best fit the instruction. For example, if a pilot is radar vectored off of a preplanned route during descent, the pilot would like to be able to select a heading that will automatically capture and track the clearance heading once the radar vector constraint is lifted. If the pilot is vectored far enough off the preplanned route, such that the original route is entirely invalidated, the pilot may want to substitute vertical speed control for the preprogrammed VNAV control and select an autothrottle speed or set thrust at idle. When this occurs, what starts as a straight-forward heading clearance change expands into a multi-axis control problem. Although pilots cope with situations resulting from ATC rerouting and reclearances, such coping has a number of disadvantages. Pilot workload is often increased as a result of such changes at a time when it should be decreased. Flight optimization is sacrificed. In some cases there is a tendency on the part of pilots to try to reprogram the route/profile instructions stored in the flight management computer when pilot attention should be focused on flight progress.

The invention is directed to overcoming the foregoing problems by providing an intervention flight management system that allows a pilot to intervene in the operation of the preprogrammed flight management computer of a flight management system and change the speed and/or flight path of an airplane in response to air traffic control instructions.

SUMMARY OF THE INVENTION

In accordance with this invention, an intervention flight management system (IFMS) that allows a pilot to intervene in the operation of the preprogrammed flight management computer of a flight management system and change the speed and/or flight path of an airplane in response to air traffic control (ATC) instructions is provided. The IFMS includes a control panel via which the pilot interfaces with an IFMS program. The IFMS program includes several subroutines that override the preprogrammed instructions stored in the memory of the flight management computer, when the subroutines are engaged. Thus, the IFMS allows the pilot to override and control the flight management computer and, thus, the airplane in response to ATC instructions to change heading, altitude, airspeed or vertical speed.

In accordance with further aspects of this invention, the IFMS control panel includes both lateral and vertical intervention knobs and switches and the IFMS program includes both lateral and vertical subroutines.

In accordance with other aspects of this invention, the IFMS control panel includes a direction control knob and the IFMS program includes a direction subroutine that provides lateral intervention and is engaged and controlled by the direction control knob.

In accordance with still other aspects of this invention, the direction subroutine is engaged and disengaged by the depression of the direction control knob. Further, when the direction subroutines is engaged, the direction of the airplane is controlled by the rotary position of the direction knob. Also, preferably, the IFMS control panel includes a heading/track selection switch what selectively enables heading and track paths through the direction subroutine. The heading and track paths provide the pilot with heading and track override selections.

In accordance with yet other aspects of this invention, the IFMS control panel includes an altitude control knob and the IFMS program includes an altitude subroutine that provides vertical intervention and is engaged and controlled by the altitude control knob. Preferably, the altitude subroutine is engaged by the depression of the altitude control knob and the altitude of the airplane is controlled by rotating the altitude control knob until the desired altitude appears on a suitable display.

In accordance with other further aspects of this invention, the IFMS control panel includes a speed control knob and the IFMS program includes a speed subroutine that also provides vertical intervention and is engaged and controlled by the speed control knob. Preferably, the speed subrountine is engaged by depression of the speed control knob and, when engaged, the speed of the airplane is controlled by the rotary position of the speed control knob. Also, preferably, the IFMS control panel includes an indicated air speed (IAS)-/MACH selection switch that selectively enables IAS and MACH paths through the speed subroutine. The IAS and MACH paths provide the pilot with IAS and MACH speed override selections.

In accordance with yet still other aspects of this invention, the IFMS control panel includes a vertical path control knob and the IFMS program includes a vertical path subroutine that also provides vertical intervention and is engaged and controlled by the vertical path knob. Preferably, the vertical path subroutine is engaged by depression of the vertical path control knob and, when engaged, the vertical path of the airplane is controlled by the rotary position of the vertical path control knob. Also, preferably, the IFMS control panel includes a vertical speed (VS)/flight path angle (FPA) selection switch that selectively enable VS and FPA paths through the vertical path subroutine. The VS and FPA paths provide the pilot with VS and FPA vertical path override selections.

In accordance with yet still further aspects of this invention, the IFMS program also includes a pitch/-thrust computation subroutine that selectively controls the pitch and thrust of the airplane based on the rotary position of the related knobs when one of the lateral or vertical subroutines is engaged.

As will be readily appreciated from the foregoing description, an intervention flight management system (IFMS) formed in accordance with the invention allows a pilot to override the automatic flight management modes of a flight management system, designed to fly an airplane along a preplanned route/profile in optimized fashion, as required to accommodate unexpected deviations called for by ATC. Rather than the "all or nothing" guidance provided by existing systems, the IFMS allows the flight management system to respond to preprogrammed instructions associated with axes unaffected by the intervention. For example, in descent, when a pilot wants to fly a constant flight path angle to a runway outer marker, the pilot need only select the desired flight path angle. The IFMS will intervene, capture and hold the selected flight path angle while continuing to adjust pitch and thrust to fly at optimized speed along the preprogrammed route. The IFMS will automatically return to fully optimized flight along the preprogrammed profile when the intervention is cancelled. In essence, the invention responds to pilot inputs in the same way the pilot responds to ATC disruptions.

BRIEF DESCRIPTION OF THE DRAWINGS

The foregoing and other advantages and features of this invention become more readily appreciated as the same becomes better understood by reference to the following detailed description when taken in conjunction with the accompanying drawings wherein.

DESCRIPTION OF THE PREFERRED EMBODIMENT

Figure 1:
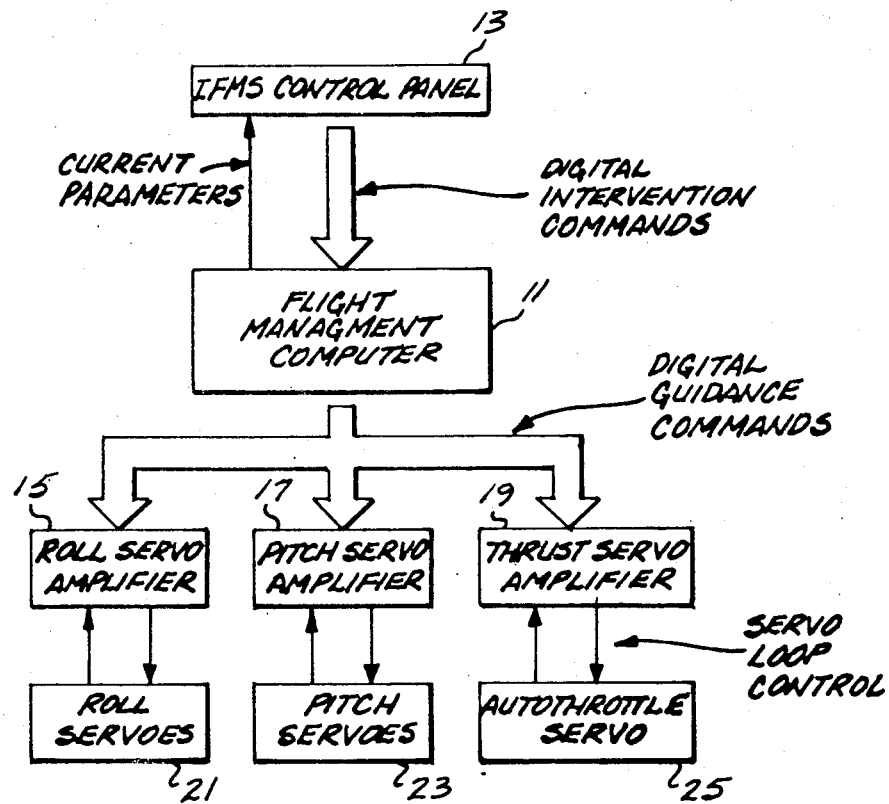
FIG. 1 is a block diagram of a flight management system that includes an intervention flight management system (IFMS) formed in accordance with the invention.

FIG. 1 is a block diagram illustrating a flight management system (FMS) incorporating an intervention flight management system (IFMS) formed in accordance with the invention. More specifically, FIG. 1 includes: a flight management computer 11; IFMS control panel 13; roll, pitch and thrust servo amplifiers 15, 17 and 19; and, roll, pitch and autothrottle servos 21, 23 and 25. While FIG. 1 shows the IFMS control panel 13 as transmitting digital intervention commands to the flight management computer and receiving current parameter signals from the flight management computer, it is to be understood that this is a pictorial representation showing the functional operation of the IFMS. While the depicted arrangement could be used in an actual embodiment of the invention, a more likely arrangement would be for the flight management computer to periodically interrogate the status of knobs and switches forming part of the IFMS control panel and use the resultant information to engage, disengage and control paths through the subroutines of an IFMS program stored in the flight management computer 11 along with programs that create other automatic flight control modes, such as LNAV and VNAV flight control modes.

Based on preprogrammed instructions and/or intervention commands, the flight management computer 11 produces digital guidance commands, which are applied to the roll, pitch and thrust servo amplifiers 15, 17 and 19. In accordance with the digital guidance commands, the roll, pitch and thrust servo amplifier 15, 17 and 19 generate servo signals that are applied to the roll, pitch and autothrottle servos 21, 23 and 25, respectively. The roll, pitch and autothrottle servos 21, 23 and 25 produce feedback servo position signals that are applied to the roll, pitch and thrust servo amplifiers 15, 17 and 19. As a result, servo loop control systems are formed between the roll servo amplifier 15 and roll servos 21, between the pitch servo amplifier 17 and the pitch servos 23 and between the thrust servo amplifier 19 and the autothrottle servo 25. Thus, the digital guidance commands produced by the flight management computer 11 control the orientation and speed of the airplane. In this regard, it is to be understood that FIG. 1 is a simplified block version of a sophisticated, substantially more complicated, system for controlling the orientation and speed of an airplane. Since the invention resides in the IFMS, not in details of how the flight management computer 11 controls the orientation and speed of an airplane, the details of such systems are not described here.

Figure 2:
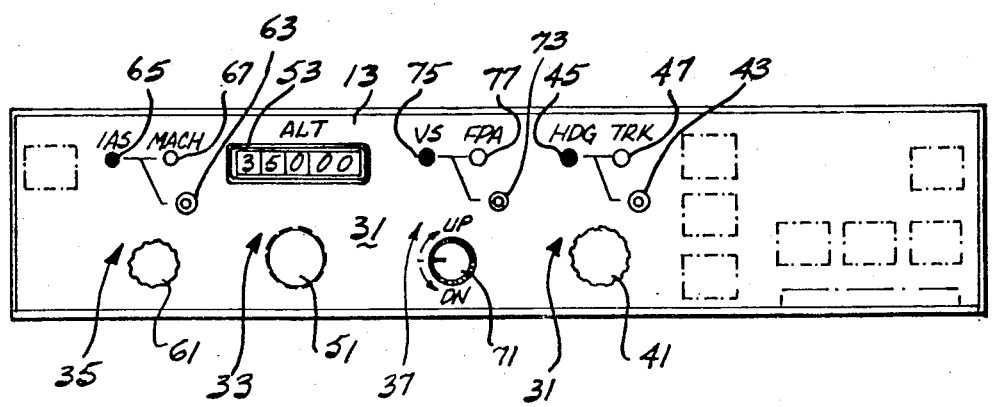
FIG. 2 is a pictorial diagram of an IFMS control panel suitable for use in the IFMS formed in accordance with the invention.

FIG. 2 is a pictorial diagram illustrating a panel suitable for use in an IFMS formed in accordance with the invention. In addition to including knobs and switches suitable for forming an IFMS control panel 13, the illustrated control panel also includes other switches, such as autopilot engagement switches, shown in phantom. The IFMS control panel 13 includes four sections -- a direction section 31; an altitude section 33; a speed section 35; and a vertical path section 37. In addition to knobs and switches, each section of the IFMS control panel 13 includes related indicators.

The direction section 31 includes: a direction knob 41; a heading/track selection switch 43; a heading indicator light 45; and, a track indicator light 47. The heading/track selection switch 43 is a toggle switch that toggles between heading and track modes of operation. The heading and track indicator lights 45 and 47 depict the state of the heading/track selection switch 43 when the direction subroutine of the hereinafter described IFMS program is engaged. In this regard, the direction subroutine is engaged by depressing the direction knob 41. Rotating the direction knob, after it has been depressed, controls the direction of the airplane, i.e., rotation of the direction knob steers the airplane. A second depression of the direction knob 41 cancels direction intervention. This results in the airplane intercepting and following the preprogrammed flight route entered into the flight management computer prior to takeoff, of during the flight. That is, the airplane returns the LNAV mode of operation of the flight management computer. If the airplane is not on the preprogrammed flight route when direction intervention is cancelled, the airplane follows the heading or track determined by the rotational position of the control knob 41 until the preprogrammed flight route is captured. It the preprogrammed flight route cannot be captured by following the heading or track determined by the rotational position of the control knob, a suitable display is created.

The altitude section 33 of the IFMS control panel 13 includes: an altitude knob 51 and an altitude display 53. Rotation of the altitude knob 51 controls the numerical value displayed by the altitude display 53. After the chosen numerical altitude is set, depression of the altitude knob initiates a climb/descent to the selected altitude. As will be better understood from the following description of the altitude subroutine of the IFMS program, altitude constraints between the current and selected altitudes are deleted.

The speed section 35 of the IFMS control panel 13 includes: a speed knob 61; indicated airspeed (IAS)-/MACH select switch 63; an IAS indicator light 65; and, a MACH indicator light 67. The IAS/MACH select switch is a toggle switch that toggles between IAS and MACH modes of operation. The IAS and MACH indicator lights 65 and 67 depict the state of the IAS/MACH select switch when the speed subroutine of the hereinafter described IFMS program is engaged. In this regard, the speed subroutine is engaged by pressing the speed knob 61. When the speed knob is pressed, the speed subroutine is sychronized to the current airplane speed. Thereafter the speed of the airplane is increased or decreased by rotating the speed knob. Pressing the knob a second time cancels the speed intervention mode of operation and returns the airplane to control by the preprogrammed speed instructions stored in the flight management computer 11, i.e., airplane speed is controlled by the VNAV speed schedule.

The vertical path section 37 of the IFMS control panel 13 includes: a vertical path knob 71; a vertical speed (VS)/flight path angle (FPA) select switch 73; a VS indicator light 75; and, an FPA indicator light 77. As with the direction and speed sections 31 and 35, the VS/FPA select switch 73 is a toggle switch that toggles between vertical speeds and flight path angle modes of operation. The VS/FPA indicator lights 75 and 77 depict the staet of the VS/FPA select switch 73 when the vertical path subroutine of the hereinafter described IFMS program is engaged. In this regard, the vertical path subroutine is engaged by pressing the vertical path knob 71. When the vertical path knob is pressed, the vertical path subroutine is synchronized to the current vertical speed or flight path angle, depending upon the state of the VS/FPA select switch 73. Rotation of the knob in the up or down direction causes the selected criteria (vertical speed or fligth path angle) to increase or decrease, depending upon the direction of rotation. When it is desired to terminate vertical path intervention, the vertical path knob 71 is again depressed, which results in control of the airplane returning to the preprogrammed instructions stored in the flight management computer 11. That is, the airplane returns to following the VNAV profile instructions.

Figure 3:
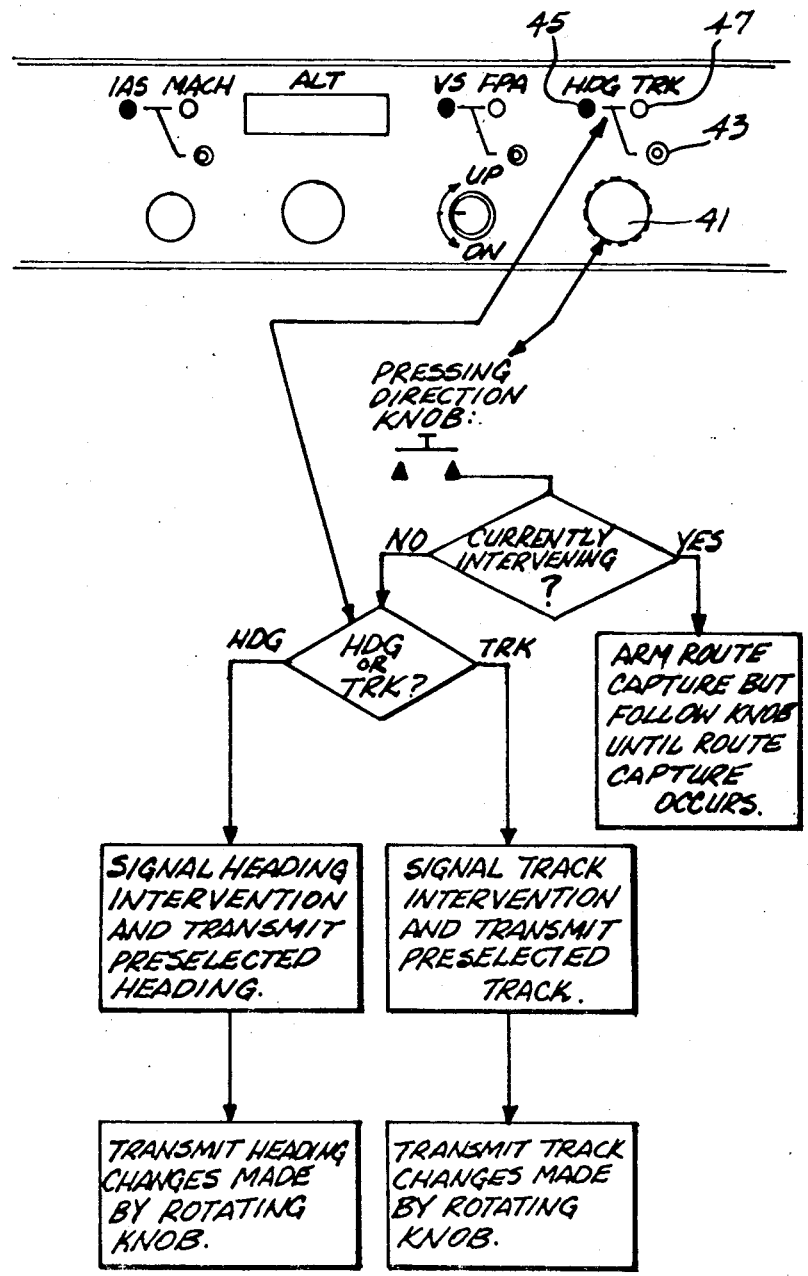
FIG. 3 is a functional diagram illustrating the lateral intervention portion of an IFMS formed in accordance with the invention.
Figure 4:
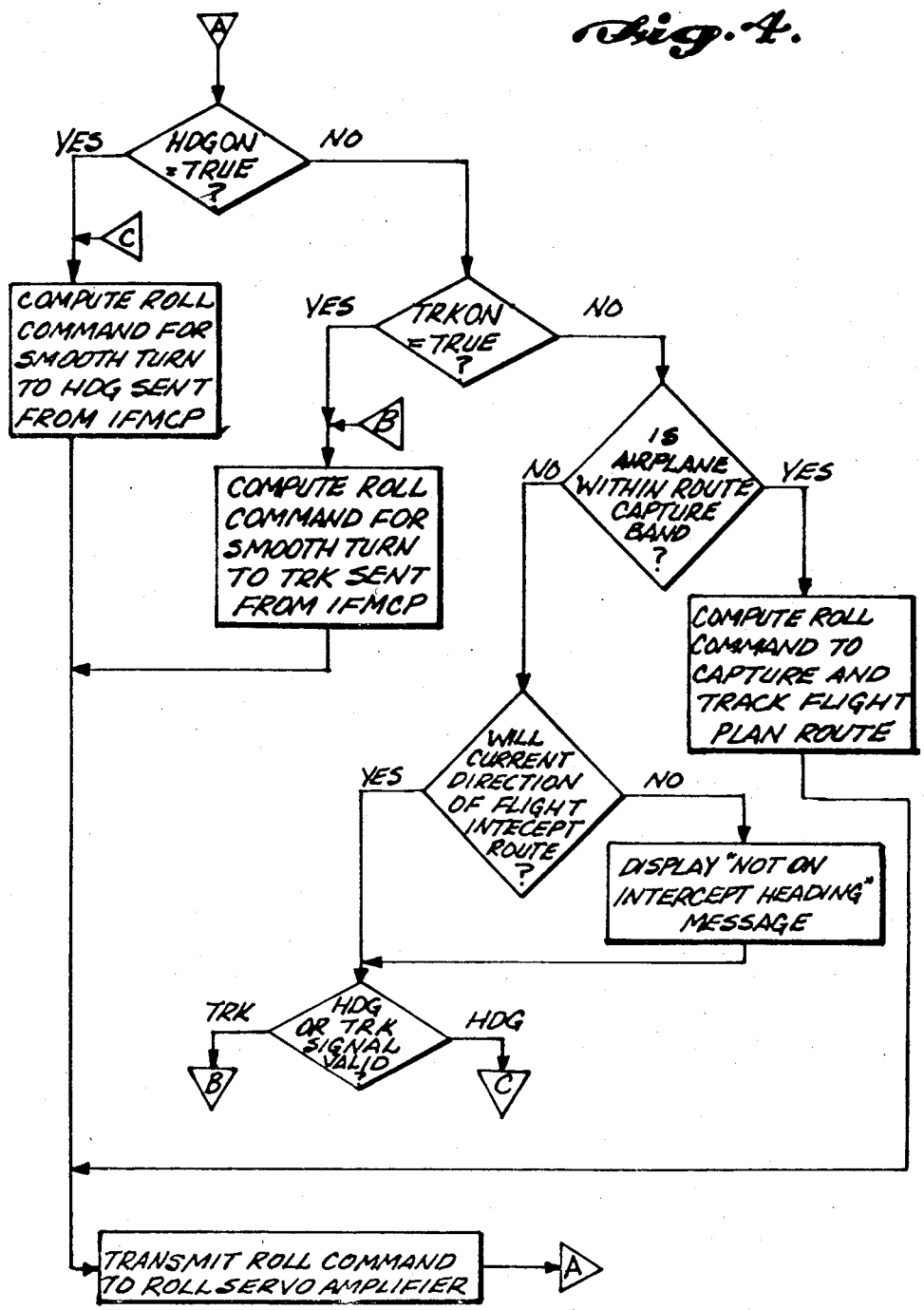
FIG. 4 is a flow diagram illustrating a direction subroutine suitable for use in an IFMS program formed in accordance with the invention to accomplish lateral intervention.

FIG. 3 is a functional block diagram illustrating the lateral intervention, i.e., direction, portion of an IFMS formed in accordance with the invention. While the depicted functions could be carried out in various ways, preferably, the functions are carried out by a programmed computer. A flow diagram showing the major sections of a suitable program is illustrated in FIG. 4 and described below. Preferably, the program instructions are carried out by the flight management computer. In this regard, as discussed above, preferably, the flight management computer system will periodically interrogate the various knobs and switches illustrated in FIG. 2 and described above in order to determine their state and store the results of the interrogation until the next interrogation. As conventional in digital computers, the results of the interrogation are used to set and clear computer flags.

As illustrated in FIG. 3, the first function performed by the direction portion of an IFMS formed in accordance with the invention is a determination of the direction intervention status prior to each depression of the direction knob 41. If direction intervention was engaged prior to the depression of the direction knob, depressing the direction knob terminates direction intervention and a route capture mode of operation is armed. If the airplane is not on the preprogrammed flight route at the time direction intervention is terminated, as noted above, the airplane follows the direction determined by the rotational position of the direction knob 41 until route capture occurs. As will be better understood from the following description, if route capture cannot occur following the present heading when direction intervention is terminated, the pilot is warned that route capture cannot occur.

If direction intervention was not engaged when the direction knob 41 was depressed, it is engaged when the knob is pressed. Then, a test is made to determine whether the heading/track select switch 43 is in a heading state or a track state. If in a heading state, the heading light 45 is lit and the preselected heading is transmitted to the flight management computer. Thereafter, heading changes are made in response to rotation of the direction knob 41. If the heading/track select switch 43 was in the track state, or is switched to the track state, the track light 47 is lit and a preselected track is transmitted to the flight management computer. Thereafter, track changes are made by rotating the direction knob 41.

FIG. 4 is a flow diagram of a direction subroutine suitable for use in an IFMS program formed in accordance with the invention to carry out functions illustrated in FIG. 3. The first step in the subroutine is a determination of whether the heading intervention mode of the direction subroutine is engaged. This determination can be carried out by testing a flag whose state is controlled by the toggling of the direction knob switch 41 and the heading/track select switch 43. If the result of this interrogation (HDGON=TRUE?) is positive, i.e., the heading intervention flag is set, a roll command for a smooth turn to the heading denoted by the rotary position of the direction knob is computed. Then, the computed roll command is transmitted to the roll servo amplifier (FIG. 1), resulting in the airplane turning toward the desired heading, if the airplane is not on that heading. Then, the direction subroutine cycles back to the point where the heading intervention flag is tested to determine if it is set (HDGON=TRUE?).

If the heading flag is not set, a test is made to determine if the track intervention flag is set (TRKON=TRUE?). As noted above, heading or track intervention is determined by the heading/track select switch 43. In any event, if the track intervention flag is set, a roll command for a smooth turn to the track stored in the flight management computer is computed. The computer roll command is then transmitted to the roll servo amplifier where it is used to turn the airplane, if necessary, towards the track direction.

If the track intervention flag is not set, a test is made to determine if the airplane is within the route capture band. This test is only reached if the direction intervention subroutine program of the IFMS is not "engaged." The test, in essence, determines if the airplane is close enough to the route preprogrammed into the flight management computer to make a smooth turn onto the preprogrammed route. If the airplane is within the route capture band, a roll command that will capture and track the flight plan route is computed and transmitted to the roll servo amplifier. If the airplane is not within the route capture band, a test is made to determine if the direction of flight of the airplane will intercept the preprogrammed route. If the current direction of the flight will intercept the preprogrammed route, the direction subroutine cycles back to the test of the heading and track intervention flags. If the direction of the airplane will not intercept the route, a "NOT ON INTERCEPT HEADING" message is displayed. Thereafter, the direction subroutine determines whether heading or track intervention was last in use. If heading, the direction subroutine cycles to the step of computing a roll command for a smooth turn to the heading controlled by the rotational position of the direction knob. Alternatively, if track, the subroutine cycles to the step of computing a roll command for a smooth turn to the track controlled by the rotational position of the direction knob. While the NOT ON INTERCEPT HEADING message could be displayed on the IFMS control panel 13, preferably, it is displayed on the display of the control and display unit (CDU), e.g., the panel, associated with the flight management computer.

As will be readily appreciated from the foregoing description of FIGS. 3 and 4, the direction intervention path of the IFMS, when engaged, in essence, computes a smooth roll to a heading or track direction that is determined by the rotational position of the direction knob 41. When direction intervention is not engaged, the airplane will fly on the present heading or track until it nears the preprogrammed route. When it nears the preprogrammed route, the airplane will make a smooth transition to the preprogrammed route.

Figure 5:
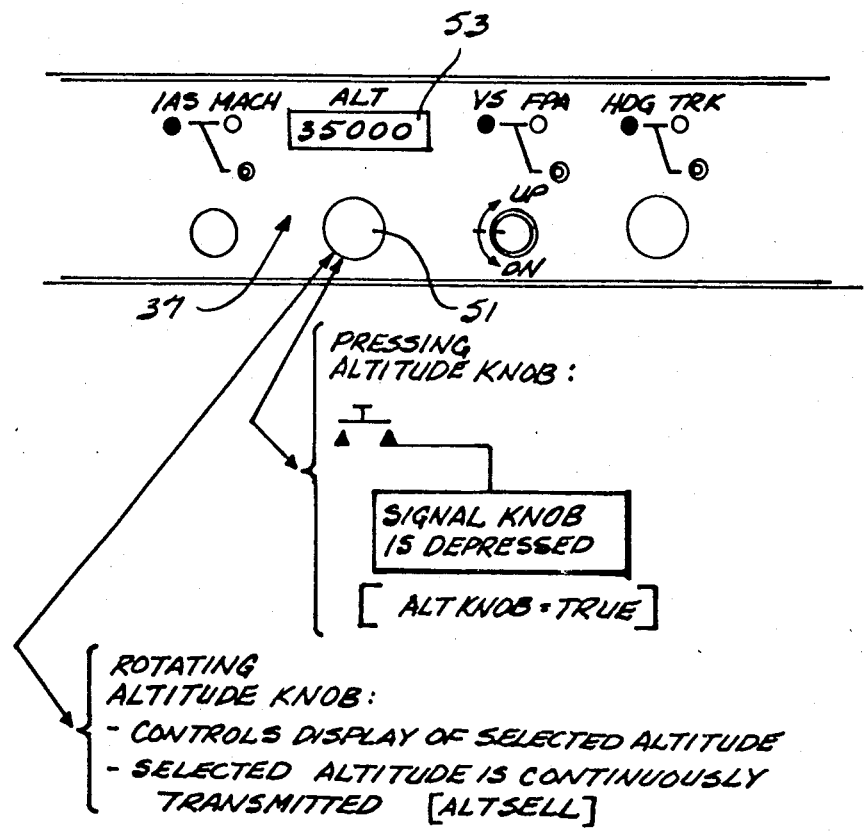
FIG. 5 is a functional diagram of the altitude section of the vertical intervention portion of an IFMS formed in accordance with the invention.
Figure 8A:
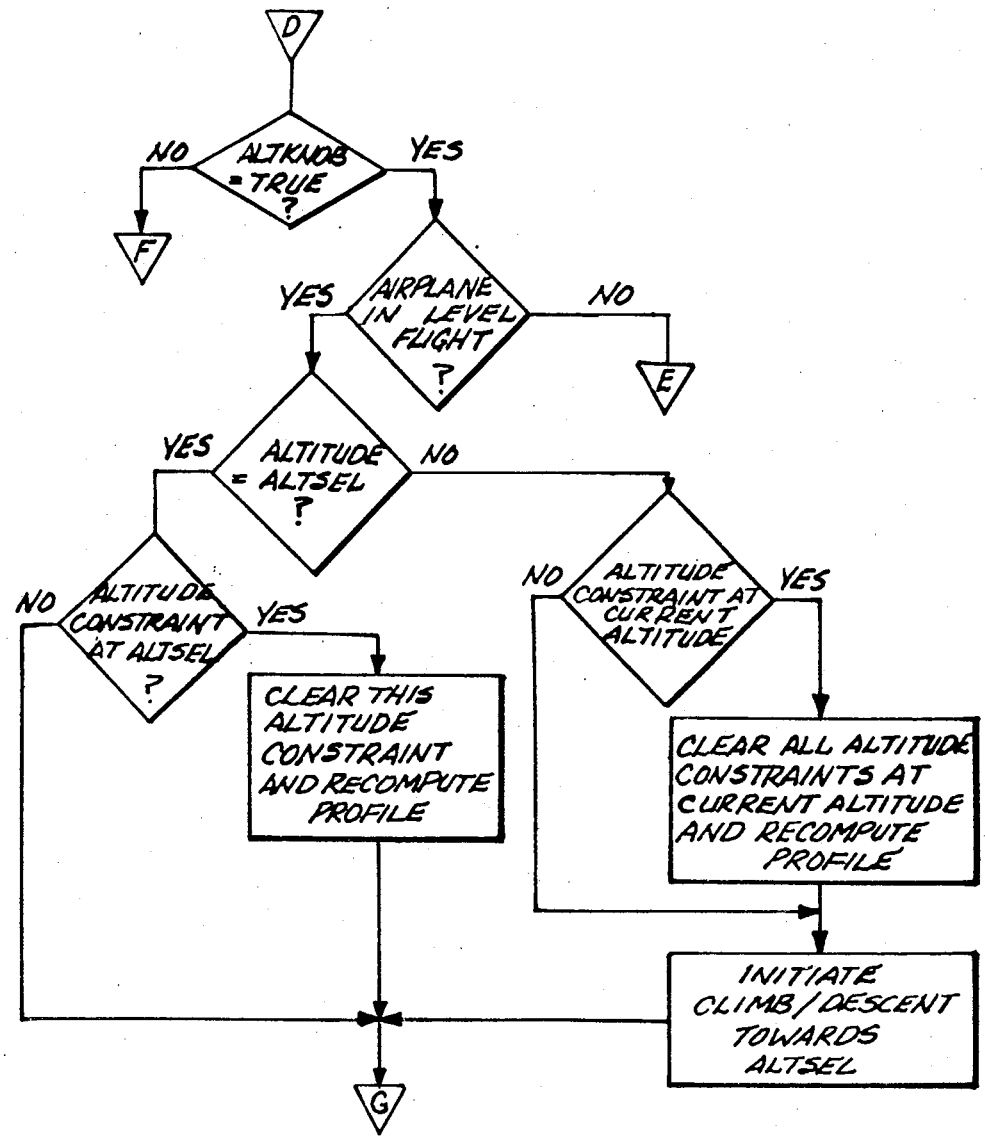
FIGS. 8A-C form a flow diagram illustrating an altitude subroutine suitable for use in an IFMS program formed in accordance with the invention to accomplish altitude intervention.
Figure 8B:
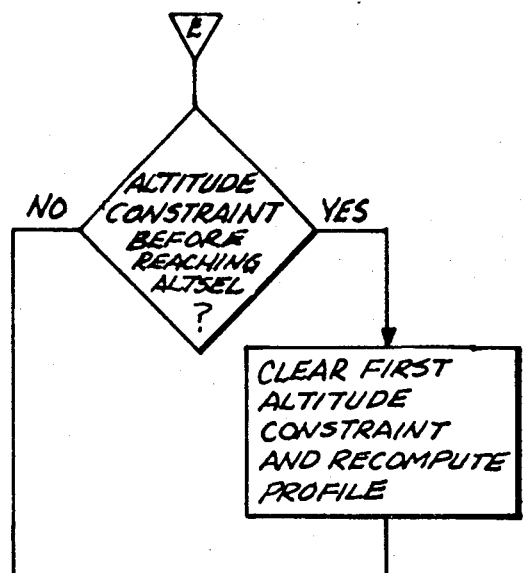
Figure 8C:
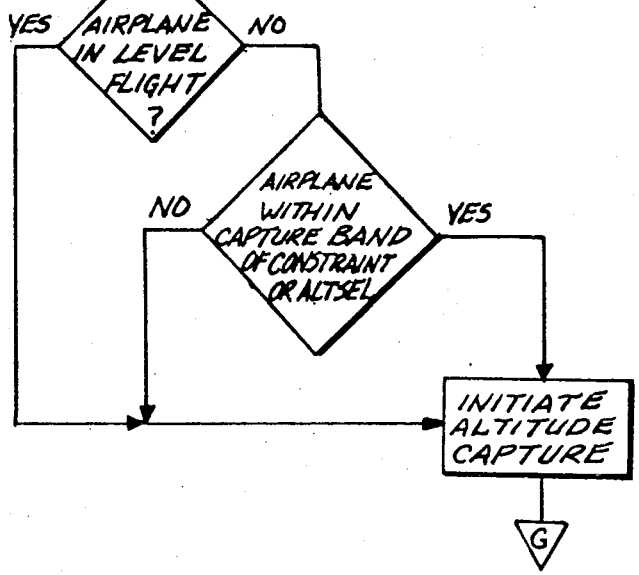

FIG. 5 is a functional diagram illustrating the altitude section of an IFMS formed in accordance with the invention. As illustrated, pressing of the altitude knob 51 sets a flag (ALTKNOB=TRUE). A subsequent pressing clears the flag (ALTKNOB=FALSE). Rotating the altitude knob controls the value displayed by the altitude display 53. The selected altitude is a signal denoted ALTSEL that is transmitted when the altitude display 53 is interrogated by the flight management computer 11. A flow diagram illustrating the operation of the altitude subroutine, which forms part of the vertical intervention section of an IFMS program formed in accordance with the invention, is illustrated in FIGS. 8A-C and described below.

Figure 6:
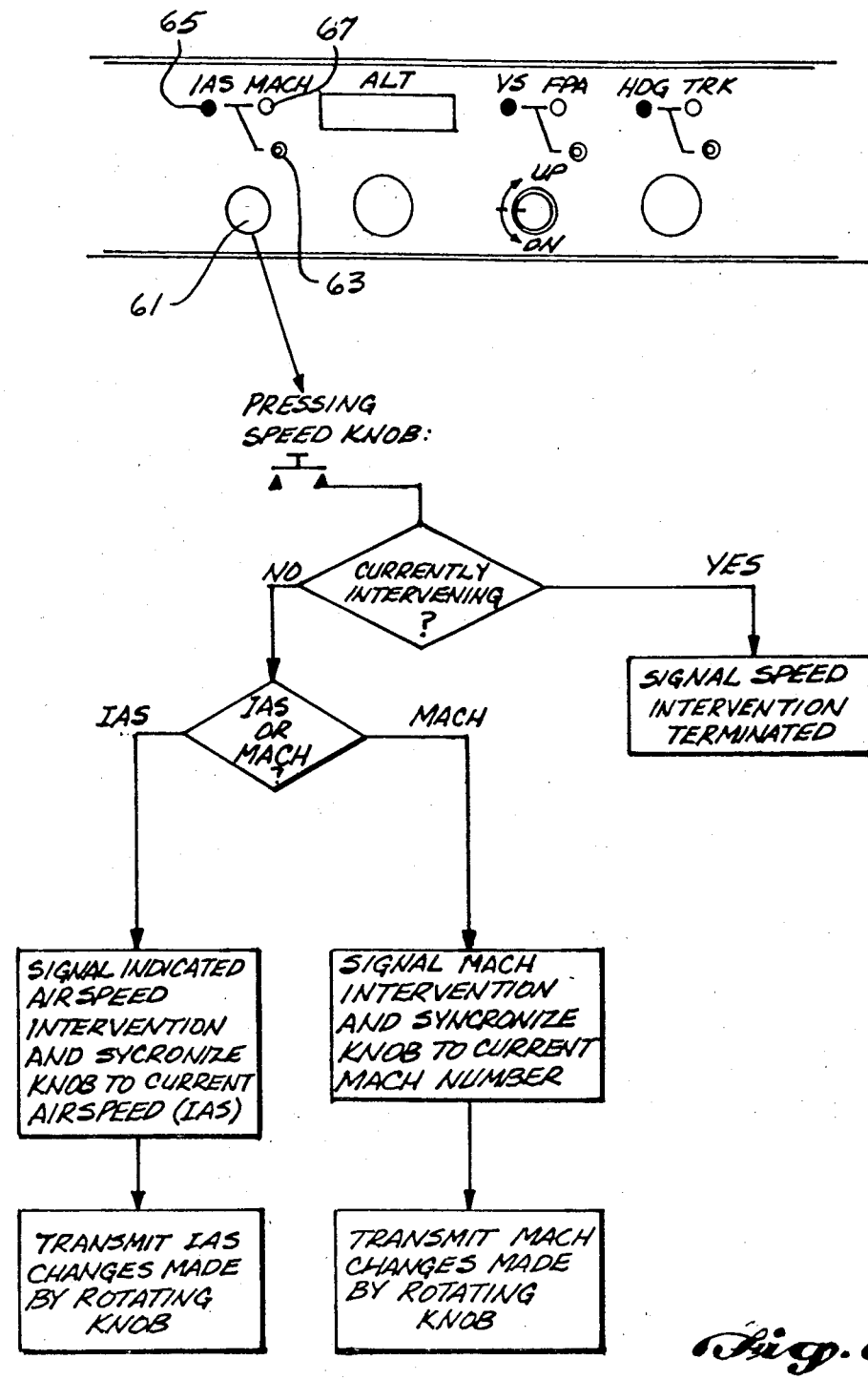
FIG. 6 is a functional diagram of the speed section of the vertical intervention portion of an IFMS formed in accordance with the invention.
Figure 9:
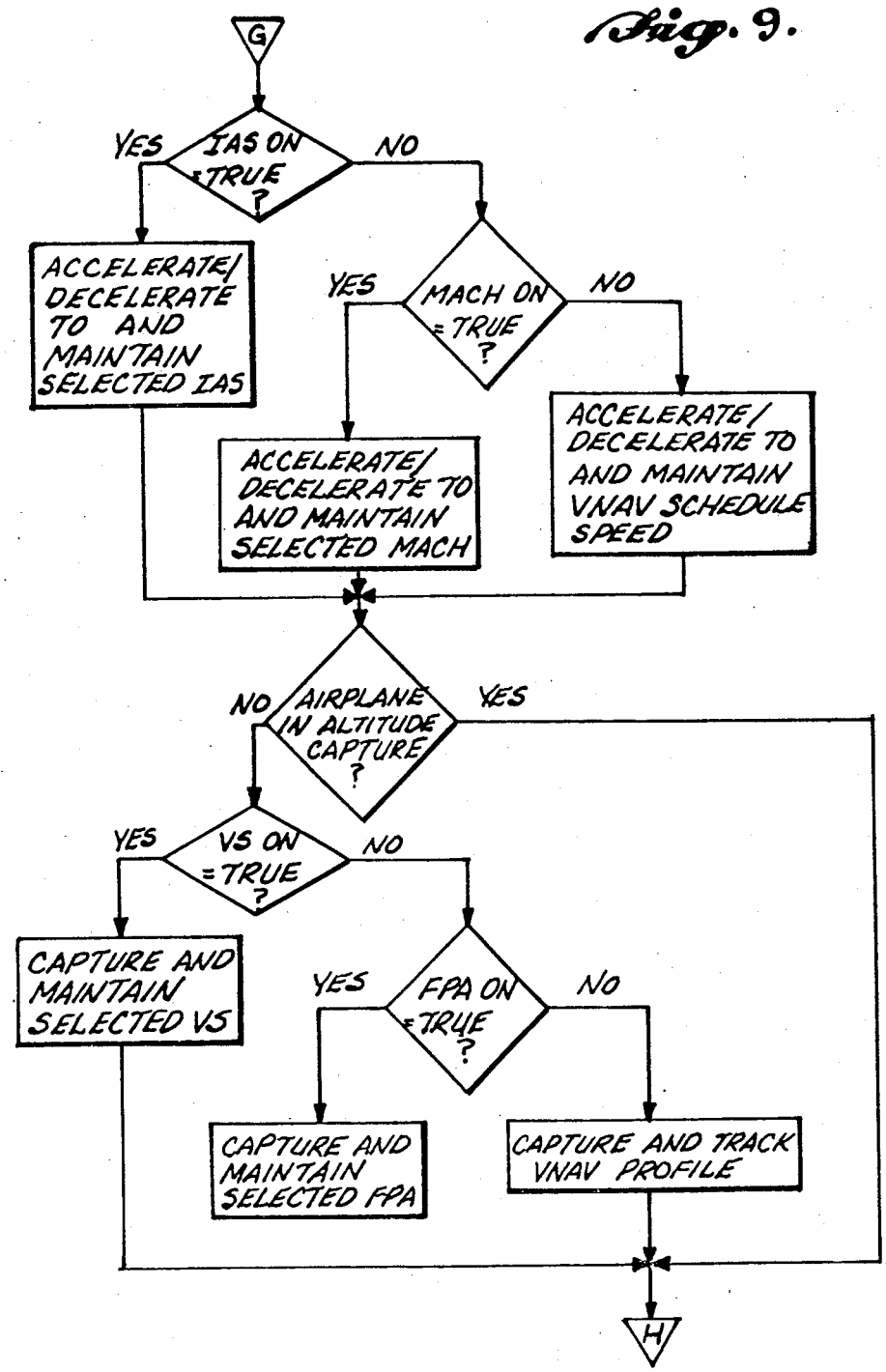
FIG. 9 is a flow diagram of a speed subroutine and vertical path subroutines suitable for use in an IFMS formed in accordance with the invention to accomplish speed intervention and vertical path intervention; and, FIGS. 10A and B form a flow diagram of a pitch/-thrust computation subroutine suitable for use in an IFMS formed in accordance with the invention to accomplish pitch and thrust computation when any of the lateral or vertical subroutines are engaged.

FIG. 6 is a functional block diagram illustrating the operation of the speed section of an IFMS formed in accordance with the invention. As illustrated in FIG. 6, the status of the speed knob 61 is periodically interrogated to determine if a change has occurred. If the prior status of the speed knob was such that the speed section 35 was engaged, speed intervention is terminated when the depression of the speed knob is detected. If, prior to detecting pressing of the speed knob, the speed section was not engaged, a test is made to determine the status of the IAS/MACH flags associated with the IAS/-MACH select switch 63. If the IAS flag is set, IAS indicator light 65 will be lit and the speed knob 61 is synchronized to the current airspeed (IAS). Thereafter, IAS changes made by rotating the speed knob are transmitted to the flight management computer when the flight management computer interrogates the speed knob. If the MACH flag is set, the MACH indicator lgith 67 is lit and the position of the speed knob 61 is synchronized to the current MACH number. Thereafter, MACH changes made by rotating the speed knob are transmitted to the flight management computer when the flight management computer interrogates the speed knob. As noted above, the IAS and MACH flags are complementary, i.e., they are in alternate set and clear states. A flow diagram illustrating the operation of a speed subroutine, which also forms part of the vertical intervention section of an IFMS program formed in accordance with the invention, is illustrated in FIG. 9 and described below.

Figure 7:
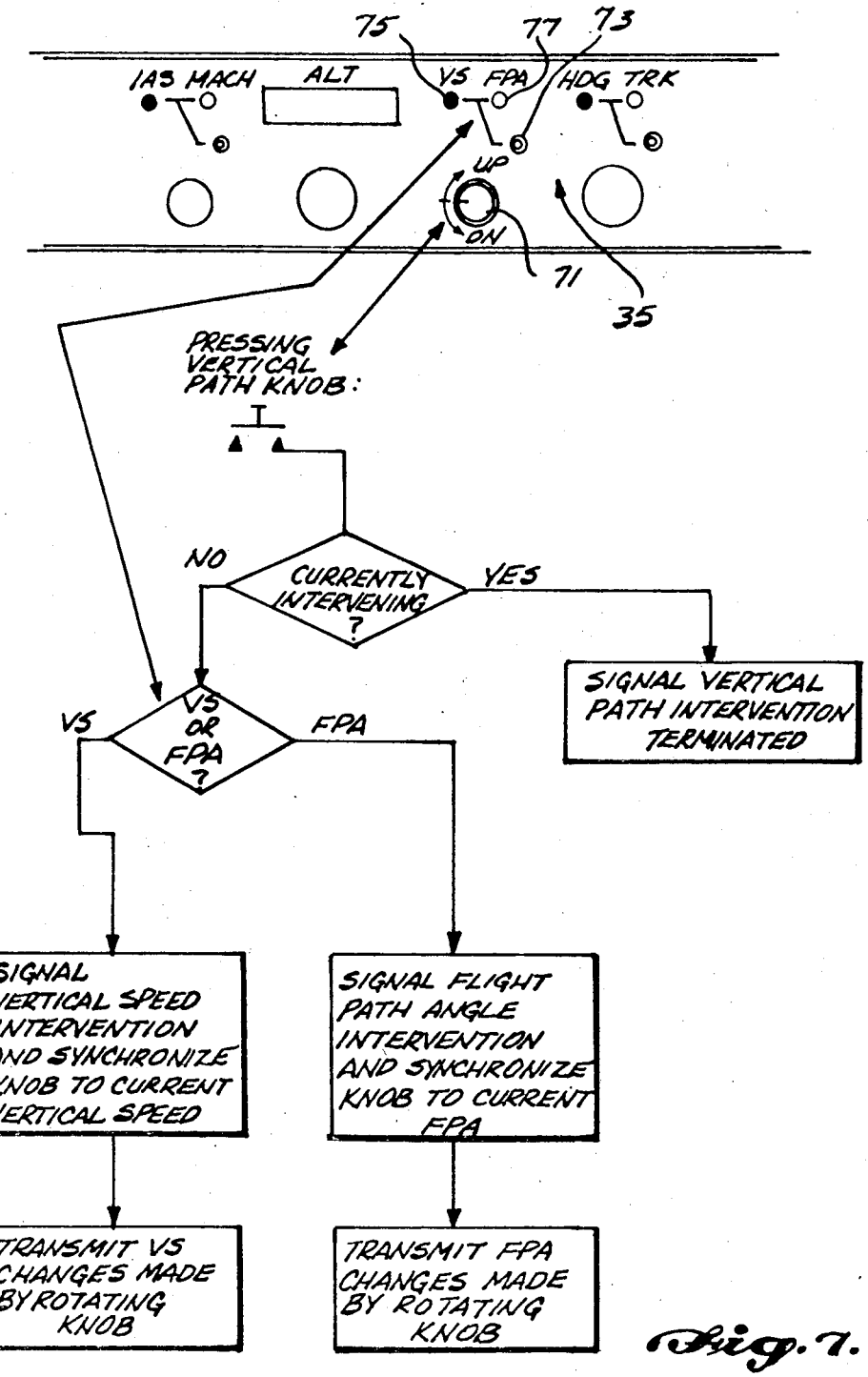
FIG. 7 is a functional diagram of the vertical path section of the vertical intervention portion of an IFMS formed in accordance with the invention.

FIG. 7 is a functional block diagram illustrating the operation of the vertical path section of an IFMS formed in accordance with the invention. As illustrated in FIG. 7, the vertical path knob 71 is tested to determine if it was pressed. If prior to pressing, the vertical path section was engaged, vertical path intervention is terminated. Conversely, if, prior to pressing, the vertical path section was not engaged, a test is made to determine which of the vertical speed (VS) and flight path angle (FPA) flags is set. If the VS flag is set, the VS indicator light 75 will be lit and the vertical path knob 71 is synchronized to the current vertical speed. Thereafter, vertical speed changes made by rotating the vertical path knob are transmitted to the flight management computer when the flight management computer interrogates the verticaal path knob 71. If the FPA flag is set, the FPA indicator light 77 will be lit and the vertical path knob is synchronized to the current FPA value. Thereafter, FPA changes made by rotating the vertical path knob 71 are transmitted to the flight management computer when the flight management computer interrogates the vertical path knob 71. The VS and FPA flags are complementary, i.e., the flags are in alternate states—one is set and the other is clear. A flow diagram illustrating the operation of a vertical path subroutine, which also forms part of the vertical intervention section of an IFMS program formed in accordance with the invention, is illustrated in FIG. 9 and described below.

As noted above, FIGS. 8A–C form a flow diagram illustrating the altitude subroutine of an IFMS formed in accordance with the invention. The first step of the altitude subroutine is a test (ALTKNOB=TRUE?) to determine if the altitude knob 51 is depressed, which determines if an altitude intervention is commanded. (As noted above, depression of the altitude knob signals altitude intervention.) If the altitude knob is depressed (ALTKNOB=TRUE), a test is made of suitable airplane sensors (not shown) to determine if the airplane is in level flight. If the airplane is in level flight, a test is made to determine if the current altitude of the airplane is equal to the selected altitude (ALTITUDE=ALTSEL?). As noted above, the selected altitude (ALTSEL) is the altitude displayed on the altitude display 53. If the current altitude is equal to the selected altitude, a test is made to determine if there is a preprogrammed altitude constraint at the selected altitude. For example, if the selected altitude is 3000 feet, a test would be made to determine if a 3000 foot altitude hold has been preprogrammed into the flight management computer prior to takeoff. If there is no altitude constraint stored in the flight management computer at the selected altitude, the IFMS program cycles to the airspeed subroutine illustrated in FIG. 9 and described below. If an altitude constraint exists at the selected altitude, the altitude constraint is cleared, i.e., removed, and the flight profile is recomputed. Then, the IFMS program cycles to the airspeed subroutine illustrated in FIG. 9. No change in airplane altitude occurs when the just-described paths are followed since the airplane is at the displayed altitude. Only an altitude constraint at the current, selected altitude is cleared if a constraint is present.

If the current altitude of the airplane is not the selected altitude, a test is made to determine if there is an altitude constraint at the current altitude. If there is no constraint at the current altitude, a climb or descent, as required, towards the selected altitude is initated. Thereafter, the IFMS program cycles to the airspeed subroutine illustrated in FIG. 9 and described below. If there is a constraint of the current altitude, the altitude constraint is cleared and the flight profile is recomputed. Thereafter, the step of initiating a climb or descent towards the selected altitude takes place and, then, the program cycles to the airspeed subroutine illustrated in FIG. 9.

As shown in FIG. 8B, if the airplane was not in level flight when the airplane in level flight test was made, a test is made to determine if an altitude constraint between the current altitude and the selected altitude is stored in the flight management computer. If not altitude constraint is stored in the flight management computer, the IFMS program cycles to the airspeed subroutine illustrated in FIG. 9. If one or more altitude constraints are stored in the flight management computer, the first contraint is cleared and the flight profile recomputed prior to the IFMS program cycling to the airspeed subroutine. The constraint clearance path illustrated in FIG. 8B comes into play when an airplane is cleared to a higher (or lower) altitude before the previous clearance altitude is reached. A typical situation involving this path occurs when an air traffic controller advises the pilot that he is cleared to 6000 feet before reaching a previous 3000 foot altitude constraint. If the pilot were at 2000 feet when the 6000 foot clearance is given, the preprogrammed 3000 foot constraint would still be stored in the flight management computer. The constraint clearance path shown in FIG. 8B clears the 3000 foot constraint prior to the 3000 foot altitude being reached when the pilot dials the 6000 foot altitude value into the IFMS control panel using the altitude knob 51 and, then, presses the altitude knob. As noted, only first or nearest constraint is cleared, other constraints remain until they are cleared by subsequent altitude intervention commands.

If the ALTKNOB is not pressed with the ALT-KNOB=TRUE? test is made, the altitude subroutine cycles to the portion of the subroutine illustrated in FIG. 8C. The first step of this portion of the altitude subroutine is a test to determine if the airplane is in level flight. If the airplane is in level flight, the IFMS program cycles to the airspeed subroutine illustrated in FIG. 9. If the airplane is not in level flight, a test is made to determine if the airplane is within the capture band of a constraint altitude or the selected altitude displayed on the altitude display 53. If the airplane is not within the capture band of a constraint altitude of the selected altitude, the IFMS program cycles to the airspeed subroutine. Alternatively, if the airplane is within the capture band of a constraint altitude or the selected altitude, an altitude capture sequence is initiated, which may include increasing or decreasing thrust in order to smoothly transfer from a climb or a descent to the constraint or the selected altitude, as the case may be. This path, which is enabled when altitude intervention is not engaged, prevents the airplane from flying through the selected altitude.

FIG. 9 is a flow diagram illustrating both an airspeed subroutine and a vertical path subroutine of an IFMS program formed in accordance with the invention. The airspeed subroutine is illustrated in the upper half of FIG. 9 and the vertical path subroutine is illustrated in the lower half of FIG. 9. The first step of the airspeed subroutine is a test to determine if the indicated airspeed (IAS) intervention flag is set (IASON=TRUE?). If the IAS intervention flag is set and the airplane's speed is not at the selected speed, the airplane is accelerated or decelerated to the selected IAS. If the IAS intervention flag is set and the airplane is at the selected airspeed, the selected IAS is maintained. Thereafter, the IFMS program cycles to the vertical path subroutine.

If the IAS intervention flag is not set, a test to determine if the MACH intervention flag is set (MACHON=TRUE?). If the MACH intervention flag is set and the airplane's speed is not at the selected MACH, the airplane is accelerated or decelerated to the selected MACH. If the MACH intervention flag is set and the airplane is at the selected MACH, the selected MACH is maintained. Thereafter, the IFMS program cycles to the vertical path subroutine. While the selected IAS and MACH values could be displayed on displays mounted on the IFMS control panel, as noted above, preferably, these parameters are displayed on the primary flight displays that normally display selected IAS and MACH values. What the present invention does is control the magnitude of these displays using the speed knob 61 in the manner heretofore described.

If the MACH intervention flag is not set, which means that the speed intervention mode of the IFMS is not engaged, the airplane is accelerated or decelerated to the VNAV schedule speed stored in the flight management computer, or the VNAV speed is maintained if the airplane speed is already at the VNAV speed. Then, the IFMS program cycles to the vertical path subroutine.

Figure 10A:
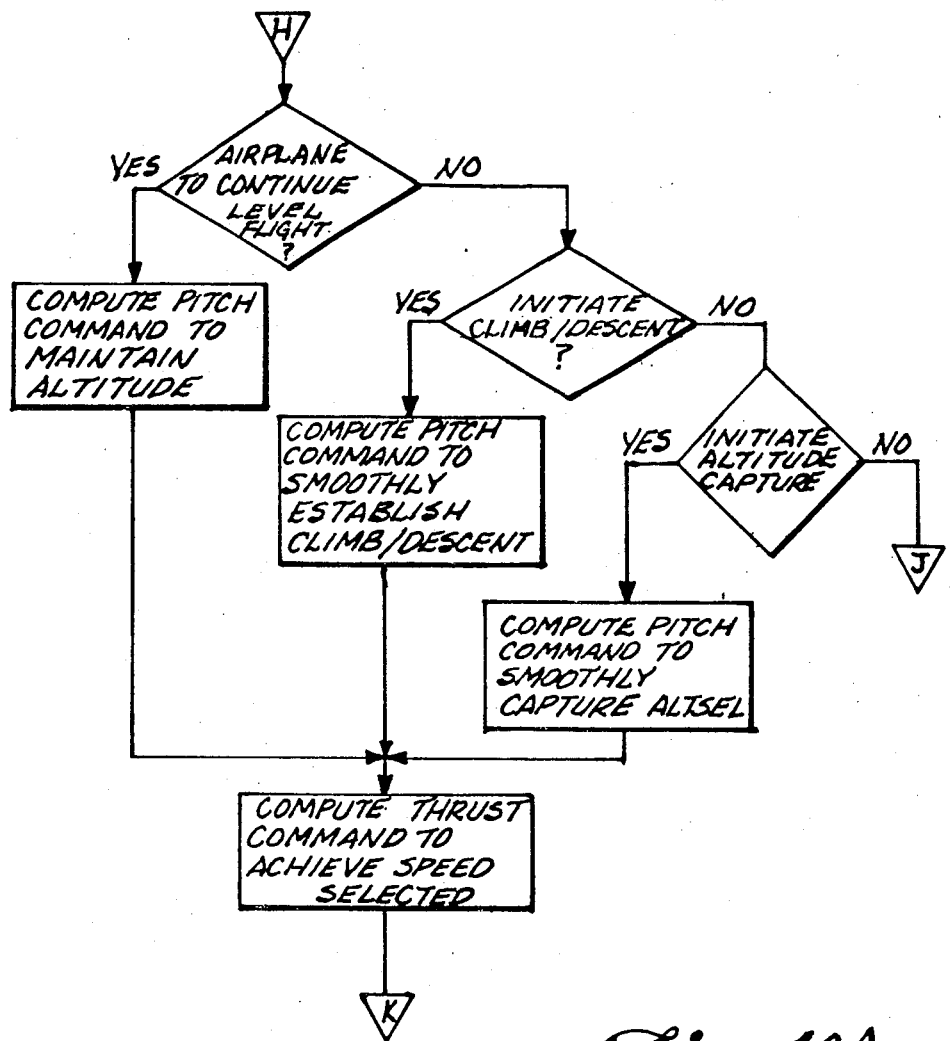

The first step of the vertical path subroutine is a test to determine if the airplane is in altitude capture, i.e., if the airplane is near the ALTSEL value. If the airplane is in altitude capture, the IFMS program cycles to the pitch/thrust computation subroutine illustrated in FIGS. 10A and 10B and described below. If the airplane is not in altitude capture, a test to determine if the vertical speed (VS) intervention flag is set (VSON=TRUE?). If the VS intervention flag is set, the vertical speed of the airplane is changed to the selected vertical speed, or the selected vertical speed in maintained if the airplane is already at the selected vertical speed. Then, the program cycles to the pitch/thrust computation subroutine illustrated in FIGS. 10A and B and described below.

If the VS intervention flag is not set, a test is made to determine if the flight path angle (FPA) intervention flag is set (FPAON=TRUE?). If the FPA intervention flag is set, the flight path angle of the airplane is changed to the selected flight path angle value or the selected flight path angle value is maintained if the airplane is already at the selected flight path angle. Thereafter, the program cycles to the pitch/thrust computation subroutine illustrated in FIGS. 10A and B. Like the IAS and MACH displays, while VS and FPA values could be displayed on the IFMS control panel, preferably, they are displayed on the primary flight displays that normally display VS and FPA values. What the present invention does is control the displayed values using the vertical knob 71 in the manner heretofore described.

If the FPA intervention flag is not set, which means that the vertical path interrogation mode of the IFMS is not engaged, the VNAV profile is captured and tracked. Thereafter, the program cycle to the pitch/thrust computation subroutine illustrated in FIGS. 10A and B.

Figure 10B:
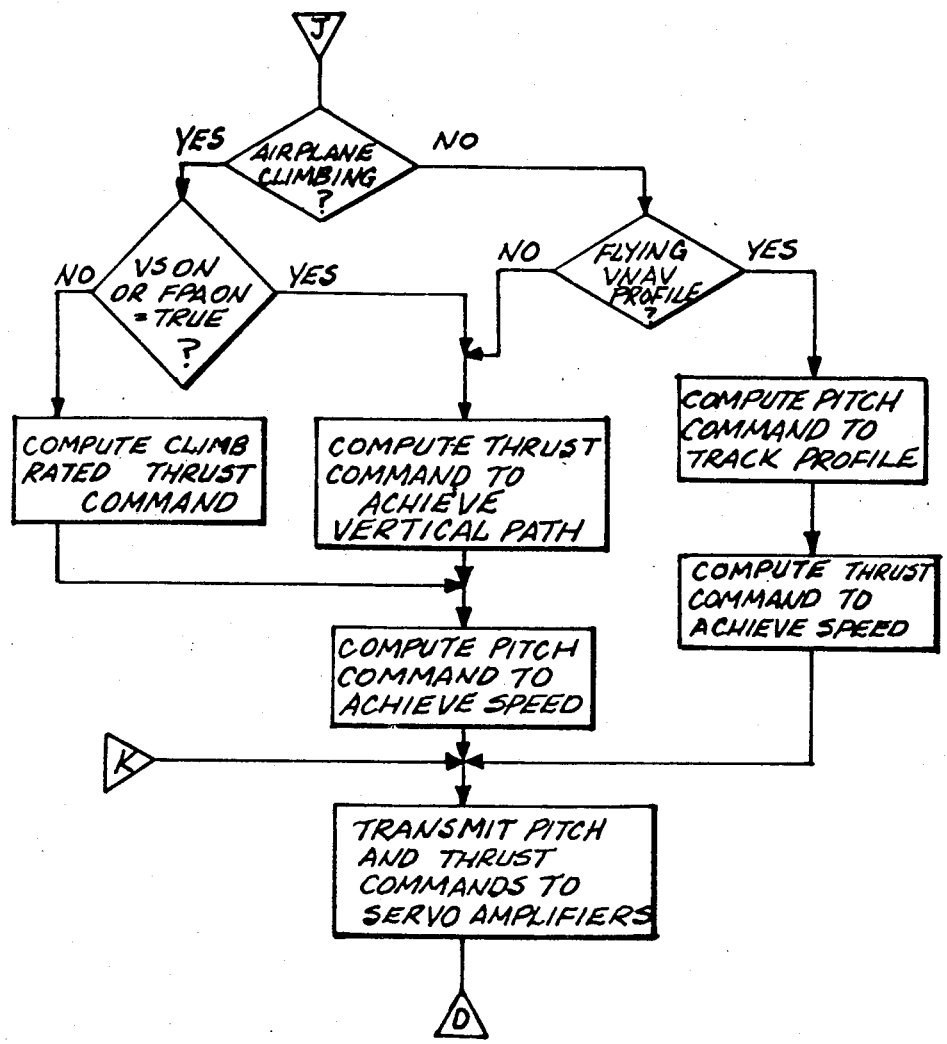

The first step of the pitch/thrust computation subroutine (FIGS. 10A and B) is a test to determine if the airplane is to continue level flight. This test is made by evaluating the results of previous tests directed to determining if the airplane is at the selected altitude. If the airplane is to continue level flight, a pitch command suitable for maintaining the current altitude is computed. Thereafter, a thrust command suitable for achieving the selected speed is computed. Then, the pitch and thrust commands are transmitted to the related servo amplifiers (FIG. 10B). If the airplane is not to continue in level flight, a test is made to determine if a climb or descent is to be initiated. If a climb or descent is to be initiated, a pitch command designed to smoothly change the attitude of the airplane to the appropriate climb/descent attitude is computed. Then, a thrust command suitable for achieving the selected speed is computed. The compound pitch and thrust commands are then transmitted to the related servo amplifiers.

If neither a climb nor a descent is to be initiated, a test is made to determine if altitude capture is to be intitiated. This test is based on the results of previous tests directed to determining if the airplane if in an altitude captrue position. If altitude capture is to be initiated, a pitch command suitable for changing the altitude of the aircraft to smoothly capture the selected altitude is computed. Then, a thrust command suitable for achieving the selected speed is computed. Thereafter, the computed pitch and thrust commands are transmitted to the related servo amplfiers.

If altitude capture is not to be initiated, a test (FIG. 10B) is made to determine if the airplane is climbing. If the airplane is climbing, a test is made to determine if either the VS or FPA intervention flags are set (VSON OR FPAON=TRUE?). If neither flag is set, a climb command based on the rated thrust is computed. Then, a pitch command suitable for achieveing the selected speed is computed. Thereafter, the thrust and pitch commands are transmitted to the pitch and thrust servo amplifiers. If either the VS or FPA intervention flags are set, a thrust command suitable for achieving the selected vertical speed or flight path angle is computed. Then, a pitch command suitable for achieveing the selected speed is computed. Thereafter, the computed pitch and thrust commands are transmitted to their related servo amplifiers.

If the airplane is not climbing, a test is made to determine if the airplane is following a VNAV profile. If the airplane is not following a VNAV profile, a thrust command suitable for achieveing the selected vertical path is computed followed by the computation of a pitch command suitable for achieving the selected speed. The computed pitch and thrust commands are then transmitted to their respective servo amplifiers. If the airplane is flying the VNAV profile, a pitch command suitable for tracking the VNAV profile is computed followed by the computation of a thrust command suitable for achieving the desired speed. The computed pitch and thrust commands are then transmitted to their respective servo amplifiers.

As will be readily appreciated from the foregoing description, an IFMS formed in accordance with the invention is based on the premise that the automatic flight management system of an airplane should fly the airplane along a preplanned route/profile in an otpimized fashion unless and until it is necessary for a pilot to intervene in order to accommodate unexpected deviations. Rather than the "all or nothing" guidance of prior systems, the IFMS continues to look after axes that are unaffected by the intervention. For example, in descent, if a pilot wants to fly a constant flight path angle to a runway outere marker, he need only select flight path angle intervention. The IFMS will capture and hold the desired flight path angle while continuing to adjust pitch and thrust to fly at optimized speed. The IFMS automatically will return to fully optimized flight when the intervention is cancelled. In essence, the system responds to pilot inputs in the same way a pilot responds to ATC disruptions.

An IFMS formed in accordance with the invention takes advantage of the existence of present computer based flight management systems (FMS) such as those installed in the models 757 and 767 aircraft manufactured by The Boeing Company, Seattle, Wash. Such systems are capable of flying preprogrammed routes and profiles in an optimized manner. When combined with such systems, an IFMS allows the system to continue flight management and control to the extent allowed by the intervention.

Implementing an IFMS in accordance with the invention in a computer based FMS involves two changes. First, the FMS computer must be reprogrammed to accommodate the intervention modes of the IFMS such that when an intervention is commanded, the normal guidance logic of the FMS is overridden in a manner that satisfies the intervention command. This is similar to the way speed intervention has previously been accomplished in connection with the 757/767 FMS computer. The second aspect of the IFMS formed in accordance with the invention is the provision of an intervention flight management control panel (the IFMS control panel). As illustrated and described above, the panel must be designed to allow a pilot to enter intervention commands in a manner that they can be translated into signals that can be transmitted to the FMS. One critical aspect of the FMS integration is that the autothrottle engagement must be tied to autopilot engagement.

As noted above, in the absence of intervention the IFMS is transparent to the normal operation of the FMS. During preflight, the pilot enters flight plan routes, cost index, cruise altitude and fuel reserves into the FMS by the FMS control display unit (CDU) in a conventional manner. On the IFMS control panel the pilot selects the initial constraint or clearance altitude, whichever comes first. Runway heading is selected by the pilot using the direction knob in combination with a direction display associated with the FMS.

At the beginning of the takeoff roll, the autothrottle of the airplane is engaged by pressing the takeoff/go-around switch on the thrust levers. The airplane's flight director will normally provide guidance for rotation of initial climb out. After takeoff, the autopilot is engaged. This action automatically engages the autothrottles if they are not already engaged. The airspeed and heading/track intervention modes are engaged with the IAS and heading alternatives being selected. Current airspeed and runway heading constitute the initial states.

Flap retraction is accomplished at the appropriate altitude using either of two procedures. First, the flap retraction speed could be selected using the speed knob. Alternatively, the speed knob could be pressed to cancel speed intervention allowing the VNAV to accelerate the airplane. If the first alternative is used, the speed knob would subsequently be pressed when acceleration to enroute speed climb is desired. The autothrottle would automatically transition the airplane from takeoff thrust hold to VNAV control when a flap placard, target speed in level flight or flaps up status is reached.

When in the heading/track intervention mode the airplane is steered laterally using the direction knob of the IFMS until cleared to the flight plan route. Pressing the direction knob arms the LNAV. As described above, flight would continue in the heading or track mode until the LNAV route is intercepted. At route capture, heading/track mode intervention would be automatically cancelled by transitioning into LNAV.

The IFMS will normally fly the airplane towards a selected altitude. It will never fly through or away from this altitude. It will normally comply with all climb and descent speed or altitude constraints selected or entered via the CDU of the FMS. The IFMS makes possible two forms of altitude intervention. The first occurs when the altitude selected by the IFMS is reached and VNAV is programmed to climb or descend further. When this occurs, the IFMS will transition to an altitude hold mode to prevent violation of the clearance altitude as set by the IFMS. The climb or descent can be resumed by selecting a new clearance altitude and pressing the altitude knob to initiate the climb or descent. The second form of altitude intervention occurs when the airplane has been cleared direct to the selected altitude. As discussed above, in this case, intervening speed/altitude constraints are automatically deleted when the cleared altitude is dialed in by the altitude knob and the altitude knob is pressed.

Speed intervention can be used any time the pilot wishes to control speed directly. This may occur when encountering moderate turbulence, commmplying with an ATC request or maneuvering in a terminal area. Intervention is accomplished by pressing the speed knob, which causes the IFMS to synchronize on and hold current speed. The pilot can then selet any other desired speed and the IFMS will accelerate or decelerate the airplane to the selected speed, while limiting the speed to stay within the safe speed envelope. To return to the VNAV schedule speed, the speed knob is pressed again. Intervention can be based on current airspeed (IAS) or MACH, depending upon which parameter VNAV is currently controlling. The IAS/MACH selet switch can be used to override the automatic selection.

During climb and descent, vertical path intervention can be used in a fashion similar to speed intervention. Vertical path intervention is initiated by pressing the vertical path knob. The IFMS then synchronizes on and holds the current vertical speed or flight path angle. The pilot can alter the vertical path by rotating the vertical path knob or return to the VNAV profile by pressing the vertical path knob again. The IFMS will automatically override vertical path intervention when the airplane reached the altitude capture boundary for the selected altitude. The system will return to the vertical path intervention mode when a new altitude is selected and the altitude knob is pressed. In this case, the crew would reselect the desired vertical speed or flight path angle.

When a preferred embodiment of the invention has been illustrated and described, it will be appreciated that various changes can be made therein without departing from the spirit and scope of the invention. Consequently, it is to be understood that, within the scope of the appended claims, the invention can be practiced otherwise than as specifically described herein.

The embodiments of the invention in which an exclusive property of privilege is claimed are defined as follows:

1. In an airplane flight management system that includes a flight management computer that produces airplane speed and altitude control signals in accordacne with preprogrammed instructions, said speed and altitude control signals determining the route and profile of the airplane's flight path, the improvement comprising an intervention flight management system (IFMS) integrated with said flight management computer for overriding said preprogrammed instructions, said IFMS comprising:
   an IFMS control panel including manually position-adjustable knobs and switches, and related indicators, the position of said position-adjustable knobs and switches creating lateral and vertical flight path instructions; and,
   an IFMS control means coupled to said IFMS control panel for detecting the lateral and vertical flight path instructions created by the position of said position-adjustable knobs and switches and producing airplane speed and altitude control signals in accordance with said lateral and vertical flight path instructions that override contrary speed and altitude control signals produced by said flight management computer in response to said preprogrammed instructions.

2. The improvement claimed in claim 1 wherein said IFMS control means comprises an IFMS program.

3. The improvement claimed in claim 2 wherein said IFMS program is stored in said flight management computer.

4. The improvement claimed in claim 3 wherein:
   said IFMS control panel includes a direction section, an altitude section, a speed section and a vertical path section; and said IFMS program includes a direction subroutine, an altitude subroutine, a speed subroutine and a vertical path subroutine.

5. The improvement claimed in claim 4 wherein:
the direction section of said IFMS control panel includes a depressible and rotatable direction knob; and,
said direction subroutine of said IFMS program monitors the depression status and rotatable position of said depressible and rotatable direction knob such that the depression status of said direction knob controls the engagement and disengagement status of said direction subroutine and the rotation position of said direction knob controls the direction of said airplane when said direction subroutines is engaged.

6. The improvement claimed in claim 5 wherein:
the direction section of said IFMS control panel also includes a heading/track select switch, said heading/track select switch being a toggle switch that alternates between heading and tract state each time said heading/track select switch is actuated; and,
said direction subroutine of said IFMS program monitors the state of said heading/track select switch and includes alternate heading and track paths followed in accordance with the state of said heading/track select switch.

7. The improvement claimed in claim 5 wherein:
said altitude section of said IFMS control panel includes a depressible and rotatable altitude knob and an altitude display; and,
said altitude subroutine of said IFMS program monitors the depression status and rotation position of said altitude knob such that the depression status of said altitude knob controls the altitude intervention input to said altitude subroutine and the rotational position of said altitude knob controls the altitude of said airplane.

8. The improvement claimed in claim 7 wherein:
said speed section of said IFMS control panel includes a depressible and rotatable speed knob; and,
said speed subroutine of said IFMS program monitors the depression status and rotation position of said speed knob such that the depression status of said speed knob controls the engagement and disengagement status of said speed subroutine and the rotational position of said speed knob controls the speed of said airplane when said speed subroutine is engaged.

9. The improvement claimed in claim 8 wherein:
said speed section of said IFMS control panel also includes an IAS/MACH select switch, said IAS select switch being a toggle switch that alternates between IAS and MACH positions each time said IAS/MACH switch is actuated; and,
said speed subroutine of said IFMS program monitors the state of said IAS/MACH select switch and includes alternate IAS and MACH paths followed in accordance with the state of said IAS/MACH select switch.

10. The improvement claimed in claim 8 wherein:
said vertical path section of said IFMS control panel includes a depressible and rotatable vertical path knob; and,
said vertical path subroutine of said IFMS program monitors the depression status and rotatable position of said vertical path knob such that the depression status of said vertical path knob controls the engagement and disengagement status of said vertical path subroutine and the rotational position of said vertical path knob controls the direction and rate of climb or descent of said airplane when said vertical path subroutine is engaged.

11. The improvement claimed in claim 10 wherein:
said vertical path section of said IFMS control panel also includes a VS/FPA select switch, said VS/FPA select switch being a toggle switch that alternates between VS and FPA positions each time the VS/FPA select switch is actuated; and,
said vertical path subroutine of said IFMS program monitors the state of said VS/FPA select switch and includes alternate VS and FPA paths followed in accordance with the state of said VS/FPA select switch.

12. The improvement claimed in claim 4 wherein:
said altitude section of said IFMS control panel includes a depressible and rotatable knob and an altitude display; and,
said altitude subroutine of said IFMS program monitors the depression status and rotation position of said altitude knob such that the depression status of said altitude knob controls the altitude intervention input to said altitude subroutine and the rotational position of said altitude knob controls the altitude of said airplane when said altitude subroutine is engaged.

13. The improvement claimed in claim 12 wherein:
said speed section of said IFMS control panel includes a depressible and rotatable speed knob; and,
said speed subroutine of said IFMS program monitors the depression status and rotation position of said speed knob such that the depression status of said speed knob controls the engagement and disengagement status of said speed subroutine and the rotational position of said speed knob controls the speed of said airplane when said speed subroutine is engaged.

14. The improvement claimed in claim 13 wherein:
said speed section of said IFMS control panel also includes an IAS/MACH select switch, said IAS select switch being a toggle switch that alternates between IAS and MACH positions each time said IAS/MACH switch is actuated; and,
said speed subroutine of said IFMS program monitors the state of said IAS/MACH select switch and includes alternate IAS and MACH paths followed in accordance with the state of said IAS/MACH select switch.

15. The improvement claimed in claim 13 wherein:
said vertical path section of said IFMS control panel includes a depressible and rotatable vertical path knob; and,
said vertical path subroutine of said IFMS program monitors the depression status and rotatable position of said vertical path knob such that the depression status of said vertical path knob controls the engagement and disengagement status of said vertical path subroutine and the rotational position of said vertical path knob controls the direction and rate of climb or descent of said airplane when said vertical path subroutine is engaged.

16. The improvement claimed in claim 15 wherein:
said vertical path section of IFMS control panel also includes a VS/FPA select switch, said VS/FPA select switch being a toggle switch that alternates between VS and FPA positions each time the VS/FPA select switch is actuated; and,
said vertical path subroutine of said IFMS program monitors the state of said VS/FPA select switch and includes alternate VA and FPA paths followed in accordance with the state of said VS/FPA select switch.

17. The improvement claimed in claim 4 wherein:
said speed section of said IFMS control panel includes a depressible and rotatable speed knob; and,
said speed subroutine of said IFMS program monitors the depression status and rotation position of said speed knob such that the depression status of said speed knob controls the engagement and disengagement status of said speed subroutine and the rotational position of said speed knob controls the speed of said airplane when said speed subroutine is engaged.

18. The improvement claimed in claim 17 wherein:
said speed section of said IFMS control panel also includes an IAS/MACH select switch, said IAS select switch being a toggle switch that alternates between IAS and MACH positions each time said IAS/MACH switch is actuated; and,
said speed subroutine of said IFMS program monitors the state of said IAS/MACH select switch and includes alternate IAS and MACH paths followed in accordance with the state of said IAS/MACH select switch.

19. The improvement claimed in claim 17 wherein:
said vertical path section of said IFMS control panel includes a depressible and rotatable vertical path knob; and,
said vertical path subroutine of said IFMS program monitors the depression status and rotatable position of said vertical path knob such that the depression status of said vertical path knob controls the engagement and disengagement status of said vertical path subroutine and the rotational position of said vertical path knob controls the direction and rate of climb or descent of said airplane when said vertical path subroutine is engaged.

20. The improvement claimed in claim 19 wherein:
said vertical path section of said IFMS control panel also includes a VS/FPA select switch, said VS/FPA select switch being a toggle switch that alternates between VA and FPA positions each time the VS/FPA select switch is actuated; and,
said vertical path subroutine of said IFMS program monitors the state of said VS/FPA select switch and includes alternate VS and FPA paths followed in accordance with the state of said VS/FPA select switch.

21. The improvement claimed in claim 4 wherein:
said vertical path section of said IFMS control panel includes a depressible and rotatable vertical path knob; and,
said vertical path subroutine of said IFMS program monitors the depression status and rotatable position of said vertical path knob such that the depression status of said vertical path knob controls the engagement and disengagement status of said vertical path subroutine and the rotational position of said vertical path knob controls the direction and rate of climb or descent of said airplane when said vertical path subroutine is engaged.

22. The improvement claimed in claim 21 wherein:

said vertical path section of said IFMS control panel also includes a VS/FPA select switch, said VS/FPA select switch being a toggle switch that alternates between VS and FPA positions each time the VS/FPA select switch is actuated; and,
said vertical path subroutine of said IFMS program monitors the state of said VS/FPA select switch and includes alternate VS and FPA paths followed in accordance with the state of said VS/FPA select switch.

* * * * *

UNITED STATES PATENT AND TRADEMARK OFFICE
CERTIFICATE OF CORRECTION

PATENT NO. : 4,811,230

DATED : March 7, 1989

INVENTOR(S) : Graham et al.

It is certified that error appears in the above-identified patent and that said Letters Patent is hereby corrected as shown below:

```
Column 2, line 3:    "an reclearances" should be --and reclearance--
Column 4, line 32:   "the" should be --an--
Column 10, line 11:  "has" should be --had--
Column 10, line 44:  "not" should be --no--
Column 11, line 1:   "with" should be --when--
Column 11, line 12:  "of" (second occurrence) should be --or--
Column 12, line 22:  insert --path-- before "knob"
Column 12, line 54:  "altitude" should be --attitude--
Column 14, line 16:  "of" should be --and--
Column 15, lines 37-38:  "accordacne" should be --accordance--
Column 16, line 15:  "subroutines" should be --subroutine--
Column 17, line 20:  insert --altitude-- before "knob"
```

Signed and Sealed this

Twenty-sixth Day of June, 1990

*Attest:*

HARRY F. MANBECK, JR.

*Attesting Officer*   *Commissioner of Patents and Trademarks*